Oct. 27, 1959  K. J. V. SVENSSON  2,910,179
PROCEDURE AND MEANS FOR THE SEPARATION OF SOLID MATERIALS
OF DIFFERENT SPECIFIC GRAVITIES ACCORDING
TO THE SINK-AND-FLOAT METHOD
Filed June 3, 1955  2 Sheets-Sheet 1

INVENTOR
KARL JONAS VALTER SVENSSON
BY Robert E. Burns
ATTORNEY

United States Patent Office 2,910,179
Patented Oct. 27, 1959

2,910,179

PROCEDURE AND MEANS FOR THE SEPARATION OF SOLID MATERIALS OF DIFFERENT SPECIFIC GRAVITIES ACCORDING TO THE SINK-AND-FLOAT METHOD

Karl Jonas Valter Svensson, Guldsmedshyttan, Sweden

Application June 3, 1955, Serial No. 513,009

4 Claims. (Cl. 209—172.5)

Copending patent application Ser. No. 380,733 (now Patent No. 2,850,166, dated September 2, 1958), of which the present application is a continuation-in-part, describes a procedure and means for the separation of ore and gangue particles—or of other mixtures of materials constituted by particles of different specific gravities—according to the sink-and-float method with the aid of a bed having a mean specific gravity between the specific gravities of the ore and the gangue, respectively. The separation is performed in a trough which is shaken or vibrated in such manner that the bed medium and the mixture of materials to be separated, which are, both of them, supplied at one end of the trough, move toward the other end thereof. At the passage through the trough, a division of the mixture of materials to be separated is effected under suitable conditions, so that particles having a higher specific gravity than the mean specific gravity prevailing in the bed will collect at the bottom of the trough, whereas particles having a lower specific gravity float on the bed. In the proximity of the discharge end of the trough the stream of materials is then divided into two separate layers, such division being effected, for instance, by means of a separating plate paralleling the bottom of the trough.

The present invention relates to a further development of the above-described process and to means applicable thereto and will be more fully understood by reference to the accompanying drawings wherein.

Figure 1:
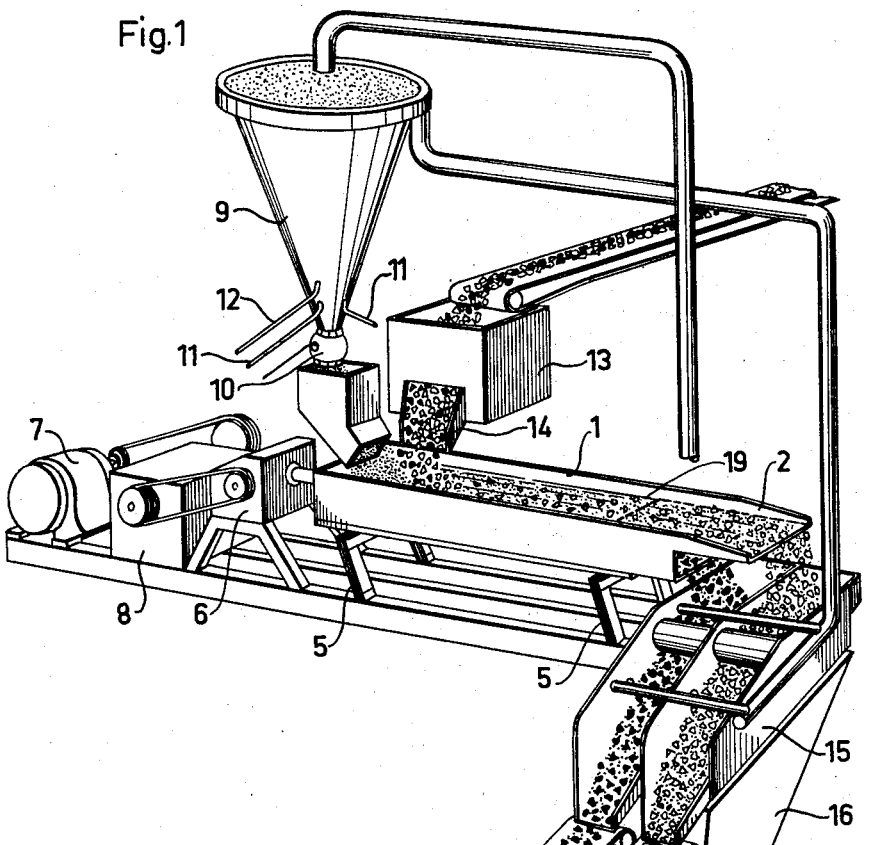
Fig. 1 is a perspective view of a separating apparatus embodying features of the invention.

In Fig. 1, 1 designates the vibrating trough, wherein the separation is taking place. The trough is constituted by a rectangular box with a plane bottom and vertical sides, said box being open at the top and at the discharge end thereof. The internal measures of the trough are 3500 millimeters in length, 250 millimeters in width and 450 millimeters in height. Located at the discharge end of the trough is the separating plate 2, which is adapted to be raised and lowered and with the aid of which the stream of material flowing ahead in the trough is divided into an upper and a lower layer. As will appear from Fig. 2, the trough is equipped with a double bottom, the upper plate of said double bottom being perforated. The space between the two bottom members is divided by means of transversely extending walls into five separate sections, to which water is conveyed under pressure through the rubber tubes 3. The quantity of water conveyed to every section of the trough may be regulated individually with the aid of the cocks 4. The trough is mounted on four wooden spring studs 5 in the same manner as a Ferrari-screen. A reciprocating motion is imparted to the trough with the aid of a vibrating table mechanism 6 of Butchart-type. The vibrating table mechanism is driven by the electric motor 7 over the speed control device 8.

The bed medium is fed onto the inner end of the trough. Said medium, which may be constituted by a mixture of water and iron ore concentrate, for example, flows down into the trough from the dewatering funnel 9 having an upper diameter of about 2.4 meters and a height of approximately 2 meters. To control the quantity of bed medium flowing into the trough per unit of time, the bottom outtake of the funnel is provided with a rubber sleeve valve 10, which is of a diameter of approximately 100 millimeters. Normally, approximately 300 liters of bed medium flow per minute down into the trough from the apex of the funnel, said bed medium having a water content of approximately 45 percent by volume. To start the bed medium flow from the funnel after a pause, during which the bed medium particles have been permitted to settle, there are three outtakes 11 for pressurized air and an intake 12 for water under pressure, said intake being located about the apex of the funnel immediately above the rubber sleeve valve. Immediately prior to opening of the rubber sleeve valve, pressurized air and flushing water are admitted, and in this way the bed medium is brought into suspension, so that it will flow out of the rubber sleeve valve in a uniform stream. After the flow has been started, it will generally be possible to cut off both the pressurized air and the water under pressure either entirely or at any rate approximately so. The pieces of raw ore to be separated should preferably have a size of 6–60 mm. The raw ore is fed down into the trough immediately after the concentrate from a pocket 13 provided with a controllable feeder 14. As appears from Fig. 2 the raw ore does not drop directly down into the bed medium but will fall on a forwardly sloping plane plate 18 of the same width as the trough and having its lateral edges welded to the side plates of the trough, said plate being positioned at sufficient height above the bottom of the trough for allowing the bed medium to flow forwards below the plate. The effect of the plate is that the raw ore is introduced into the bed medium gently and distributed evenly over the whole width of the trough at a point further away in the trough where the bed has been partly formed. The gangue particles will sink very slowly or not at all in the thick suspension 19 above the bed, whereas the ore particles will sink quickly through the suspension and more slowly through the bed. Further away in the trough, where the forming of the bed has been completed, the gangue particles will float on the bed.

Figure 2:
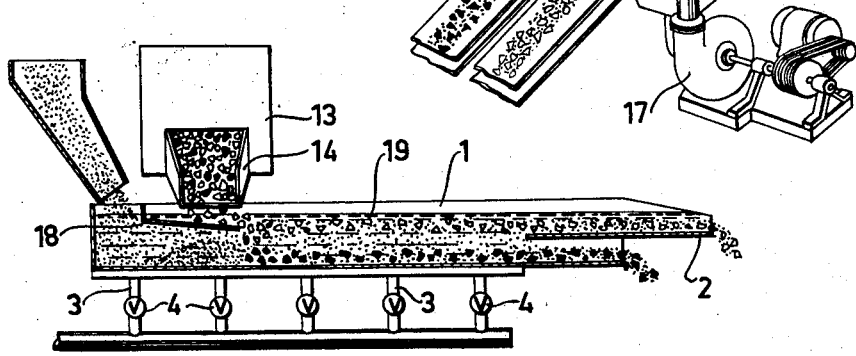
Fig. 2 is a diagrammatic sectional side view of the vibrating trough of the apparatus of Fig. 1 showing the passage of material therethrough.

The bed medium particles deposit in the trough and form a bed together with the pieces of the raw ore. The gangue particles, which are lighter than the bed, float on top of the latter. By controlling the height of the bed, the dead rock particles are brought over the separating plate 2 and the ore particles underneath the same, as indicated in Fig. 2. The two layers fed out of the trough over the plate and underneath the same, respectively, find their way each onto one half of a washing screen 15 divided into two parts 15. The screen is an ordinary freely swinging screen of an area of 0.8 x 1.6 meters and provided with a screening cloth with a mesh width of 5 millimeters so as to readily admit the bed medium therethrough while preventing the sink and float product from passing. The washing water required to flush off the bed medium from the separating products is obtained from the overflow from the funnel 9. It should perhaps be pointed out in this connection that all overflow from the funnel is not used as flushing water; a portion of this water—corresponding to the quantity of clear water supplied to the process—is permitted to flow off. The bed medium diluted with wash-water is collected in the sump 16 from which it is then pumped up into the funnel 9 with the aid of the pump 17. The pump 17 is an ordinary rubber-lined pump for the material with a capacity of 1500 to 2000 liters per minute.

In the installation as described above, separating experiments have been performed with some 20 different iron ores with broadly satisfactory results. As an example, only one result will be mentioned in this connection, the same having been attained in an experiment with a mixture of bloodstone and magnetite ores. The experiment was going on for an hour, and samples weighing 50 to 100 kilograms were taken out every tenth minute both of ore and dead rock. The following results were obtained:

| Products | Percent Fe | Weight, percent | Fe, gain percent |
| --- | --- | --- | --- |
| Entering | 34.4 | 100.0 | 100.0 |
| Sinking product | 60.2 | 51.5 | 90.0 |
| Floating product | 7.1 | 48.5 | 10.0 |

The average capacity, counting on entering ore, was 29.1 tons per hour. As a comparison might be mentioned that in concentrating this ore in magnetic separators and in jigging machines the same content of iron will be obtained in the ore product, whereas the waste contains 12.4% Fe.

However, to obtain separating results of this order, certain conditions must be fulfilled. For example, it has been found that the grain size of the bed material has a great influence on the separating process. If, namely, the bed material is too coarse, the bed becomes so hard and rigid that the mobility of the particles in the bed becomes reduced, which results in that some light particles will be obtained in the sinking product that should have found their way into the floating product, which latter receives particles that should have found their way into the sinking product. On the other hand, if the bed material is too fine, no bed will form, but the bed medium will float ahead in the form of a viscous suspension in the trough, wherein only an inferior separation is obtained. However, good separating results have been obtained with a bed material presenting the screen analysis set forth in the table below. This bed material was constituted by a magnetite-bloodstone-concentrate, which was used for the separation of iron ore from gangue.

*Screen analysis for a bed material*

| Mesh width in mm. (square meshes) | Percentage by weight of material passing through the screen in consideration |
| --- | --- |
| 1.68 | 94.5 |
| 1.19 | 85.4 |
| 0.84 | 74.6 |
| 0.59 | 63.8 |
| 0.42 | 47.7 |
| 0.297 | 28.5 |
| 0.210 | 13.3 |
| 0.149 | 6.0 |
| 0.105 | 2.7 |
| 0.074 | 1.4 |

Generally, it may be stated that, for the purpose of obtaining a good separation, the bed material must have a grain distribution such that more than 50% of the same pass through a screen having a mesh width of 1.68 millimeters (12 mesh according to the A.S.T.M. standard) while stopping on a screen having a mesh width of 0.074 millimeter (200 mesh according to the A.S.T.M. standard).

Figure 3:
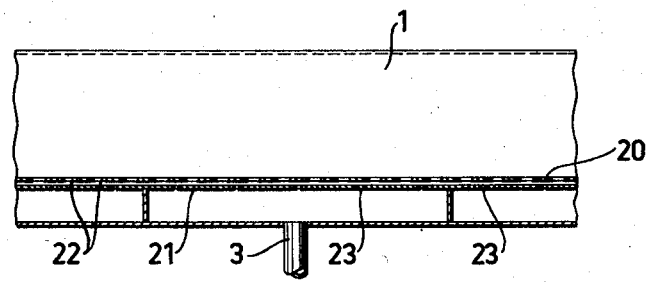
Fig. 3 is a longitudinal sectional view of a section of the trough of Fig. 2.
Figure 4:
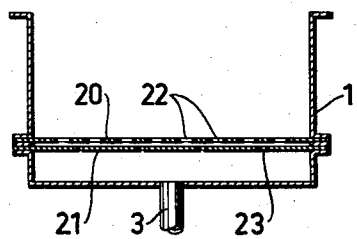
Fig. 4 is a transverse sectional view of the trough.
Figure 5:
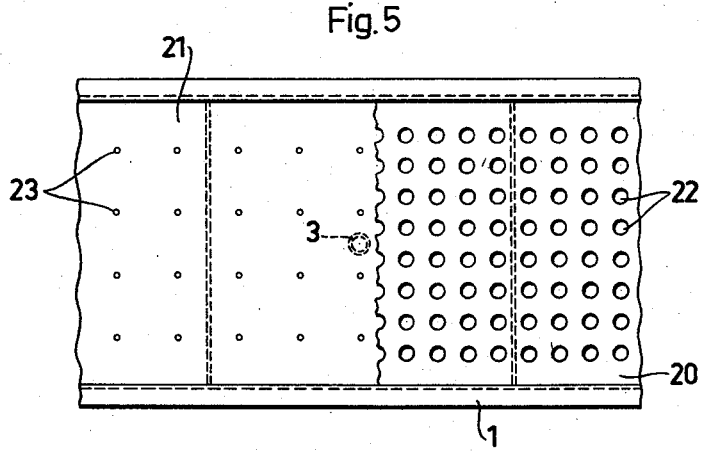
Fig. 5 is a bottom plan view of a portion of the perforated bottom plates of the trough with a portion of the lowermost plate broken away to show the construction of the upper plate.

Furthermore, it has been found that the water flushing from the bottom of the trough should be kept under a certain maximum quantity of water per unit of time and square meter of the trough bottom to provide for a good separating result. If this maximum quantity is exceeded, no bed will be formed in the trough as the auxiliary medium will then flow in the form of a suspension. Below said maximum quantity, the water serves as a lubricating agent, partly between the bottom of the trough and the bed, and partly between the particles of the bed mutually. This lubricating effect results in that the height of the bed in the trough can be readily controlled with the aid of the water flushing from beneath. If more water is admitted from below, it should be understood that the bed is fluidized so as to glide more readily ahead in the trough, which brings about a lowering of the height of the bed. On the other hand, if the water is reduced, the friction between the bed and the bottom of the trough becomes greater, involving that the velocity of the bed is reduced, while the height of the same is increased. This control of the height of the bed is very critical, but it is simple and convenient, and it will be possible with the aid of the same readily to compensate for a rise or a lowering of the height of the bed as caused by an increased or decreased feeding of the material to be separated. In order to compensate for such small variations in the height of the bed, it is generally sufficient to control the supply of water to the section immediately in front of the separating plate, since it is understood that it is the height of the bed in front of this plate that mostly influences the separation. Therefore, the supply of water to the section in front of the separating plate is the most critical factor. Then, it becomes less critical, the longer the distance is from the separating plate. At the feeding-in end it is consequently the least critical, and the suitable water flushing thereat appears to be mostly dependent on the water contents of the bed medium flowing down into the trough. With a normal percentage of water in the bed medium, that is to say with a water content of about 45 percent by volume, the water flushing should thus be as abundant at the feeding-in end as in other parts of the trough. Tests have also been made, however, with feeding of the bed material onto the trough in an almost dry state, and of course flushing with water more abundantly than normally must then be resorted to at the feeding-in end to provide for a good separation. Summarizing, it may be stated that for obtaining a good separating result the flushing with water from the bottom of the trough in that half-part of the trough located immediately in front of the separating plate should be between 0 and 200 liters per minute and square meter of the trough bottom. In this case it is important that the water flushing can be regulated individually in different longitudinal divisions of the trough, what is made possible by the box below the perforated bottom of the trough being divided into corresponding sections provided with a separate water supply for each section. The supply of the water through the bottom of the trough can be effected through perforations in the bottom plate of the trough. The holes must, however, be bored, as the bottom of the trough has to be made rather thick on account of the heavy wear to which the bottom is subjected. It is therefore necessary to use a scattered perforation of rather large holes. It has been found by experiments that a good result will be obtained by means of circular holes of a diameter of 1.5 millimeters in the bottom of the trough and a distribution of 8 holes per square decimeter. Such an arrangement has, however, the disadvantage that the water is not supplied to the bed as evenly as wanted owing to the fact that the water, which is pressed upwards through the holes, will stir up the bed whereby the separation will be disturbed. Moreover, the holes are easily clogged and therefore must be cleansed regularly what is a rather cumbersome work. A better result will be obtained by making the bottom of the trough of two parallel, perforated plates 20, 21 placed above one another at a distance of 1 or 2 millimeters, as shown in Figs. 3, 4 and 5. The upper plate 20 should then, preferably, have a rather close perforation of large holes 22, whereas the lower plate 21 should have a scattered perforation of fine holes 23 located midway between the holes 22 in the upper plate. It has been found that a suitable perforation should be 15 millimeter circular holes at a mutual distance between the centre of the holes of 30 millimeters for the upper plate, and 3 millimeter holes at a mutual distance of 60 millimeters for the lower plate. By the holes in the lower plate being covered by the upper plate no water jets will be formed which are apt to stir up the bed but the water will penetrate slowly upwards into the bed through the large holes in the upper plate. Further, clogging of the holes in the lower plate is prevented by the distance between the plates being less than the diameter of these holes. As a consequence thereof, those particles which may reach the holes will always be smaller than the holes and therefore will easily pass through the holes. In order to prevent an accumulation of particles which pass through the holes into the lower water supply boxes, it is of advantage to allow a small quantity of the water supplied to said boxes to escape through a hole in the bottom of each box. The particles will then pass away through said holes together with the water.

It was stated hereinbefore that the water content of the bed medium flowing in onto the trough normally amounts to approximately 45 percent by volume. This percentage of water is the highest at which a uniform and quiet bed medium stream out of the funnel can be maintained. In the actual bed, the percentage of water is normally only about 40 percent by volume (it varies somewhat depending on the grain shape and the distribution of the grains of the bed material), which is intimately bound up with the fact that, when the bed forms in the trough, the exceeding water, which has no room in the pores of the bed, will be pressed up together with some quantity of fine-grained bed material so as to form a suspension layer 19 floating ahead on top of the bed. For this reason it is not at all necessary to control the water percentage of the inflowing bed material more closely, inasmuch as the water percentage of the bed will nevertheless always adjust itself to a substantially constant value, which is normally at approximately 40 percent by volume.

A certain control of the specific gravity at which the separation takes place may, however, be obtained by regulating the height of the bed above the separating plate. The said specific gravity is hereinafter designated by S. Experience has shown that a somewhat higher value of S is obtainable, when the height of the bed above the separating plate is high rather than being low, which is believed to be intimately bound up with the fact that the weight by volume of the bed is somewhat lower at the surface than lower down in the same. It is difficult, however, to utilize these control facilities more than to a certain extent inasmuch as the height of the bed fluctuates somewhat up and down by reason of irregularities in the feeding. Therefore, it will not be possible to reduce the height of the bed too much. Normally, a height of the bed above the separating plate varying between one and two times the maximum particle size of the materials to be separated is made use of.

Disregarding the rather small variations of the S-value necessitated by the variations of the height of the bed above the separating plate and by the grain shape and the grain distribution of the bed material, S is substantially altogether defined by the specific gravity $S_s$ of the bed material. By a rough estimation, S may therefore be calculated out of $S_s$ according to the formula hereinbelow, which is based on the experience that the bed is normally constituted by 60 percent by volume of bed material and 40 percent by volume of water:

$S = 0.6\ S_s + 0.4 =$ the volume weight of the bed

A suitable bed material for the separation of iron ore from gangue is iron ore concentrate (magnetite and/or bloodstone concentrate). With a concentrate of this kind, a specific weight of about 3.4 is normally obtained in the separation, which proves excellent for most iron ores. The magnetite concentrate is understood to have the advantage of permitting to be very easily purified and to be recovered through its magnetic properties. For this reason, it should also deserve consideration in the practice of concentrating other ores and minerals, for instance of chromium and manganese ores and of iron sulphide according to the sink-and-float procedure in accordance with the method herein described. In concentrating carbon, the impurities of the carbon, slate and the like are believed to form the most suitable bed material. For the recovery of a particularly rich iron ore fraction for fining purposes or the like out of ordinary iron ore so-called steel shot, that is to say granulated and crushed pig iron, has been used as a medium. Since this material has a specific gravity of 7.2–7.6, an S-value of 4.7 to 5.0 will be obtained. A somewhat lower S-value (about 4.5) may be reached by the use of silicon iron holding a percentage of silicon of 15%, which material has the advantage over the steel shot of being almost rust-proof. However, the tendency of the steel shot toward rusting may be considerably reduced by an admixture of slack lime to the bed medium.

As will be seen from Fig. 1, the installation shown therein has no special purifying arrangement for the bed medium. This is bound with the fact that iron ore concentrate has been mainly used as a medium, and that this rather small plant operates in a dressing installation for such concentrate. Therefore, only a quantity of pure concentrate is added, when the medium is too contaminated. The percentage of the impurities in the concentrate is reduced partly by the thinning and partly by the fact that the impurities follow in part with the overflow from the funnel. In a larger installation one may of course proceed in the same manner, but under such circumstances one should nevertheless see to it that the portion of the overflow from the funnel that is not used as flushing water on the washing screen is caused to flow back into the dressing plant, since quite a quantity of fine-grained concentrate is to be found therein.

It should be pointed out in this connection that investigations made in the described installation have proved that the process is much less sensitive to the purity of the bed medium than one were inclined to believe. The investigations proved, namely, that the result of the separation remained practically unchanged, until the percentage of impurities rose to about 20%. The bed material then consisted of a mixture of bloodstone and magnetite concentrate, and the impurities consisted of rock of a specific gravity of approximately 2.8 as an average. The explanation of this is believed to reside in the easily observable circumstance that the bed of concentrate partly purifies itself during the vibrations by the fact that the rock grains are in part pressed up out of the bed to deposit on top of the latter.

The distance of the separating plate from the bottom of the trough may be varied, as stated. As was just pointed out, the distance will of course always have to be greater than the largest particle size of the materials to be separated, and it is desirable that the distance be at least 1.5 to 2 times as great, because the risk of the ore pieces wedging up is otherwise considerable. In the installation described above, a distance of 120 millimeters between the separating plate and the bottom of the trough is normally operated with. The largest particle size of the materials to be separated then corresponds to a mesh width of 50 to 70 millimeters (square holes). The length of the separating plate is of great importance for the separation. In the installation described, a good result is obtained when the separating plate extends 450 millimeters into the trough, counted from the end of the trough bottom. It is rather important, moreover, that the separating plate itself be formed so as to cause the least possible disturbances in the movement of the bed. This is obtained most conveniently with a rather thin plate introduced in parallel or approximately in parallel to the bottom of the trough.

The trough shown in the drawing is mounted on springs inclined somewhat backwards so as to form an angle of 80° with the horizontal plane. This inclination has proved to be most suitable when the trough is operated by a vibrating table mechanism. The inclination of the springs is, however, not critical as satisfactory separation is obtained also when the angle of inclination against the horizontal plane lies within the interval of 70–90°. Instead of using springs the trough may be mounted on horizontal or slightly backwardly inclined slides in the same way as in vibrating boards commonly used. When the trough is operated by means of an excenter mechanism it is most suitable from a constructive point of view to mount the trough on springs. The best result is then obtained when the springs take up a backwardly inclined position to form an angle of 75° with the horizontal plane, i.e. the same angle of inclination commonly used in Ferrari-screens. Also in this case a deviation of 5–10° from this position has no essential influence on the separation capacity.

In order to obtain a satisfactory transporting capacity the trough should slope somewhat forwardly against the discharge end. A suitable angle of inclination is 1–2° between the plane of the trough and the horizontal plane. The way in which the goods to be separated is supplied on to the trough is also of importance. For the purpose of obtaining high capacities with satisfactory separation the goods should be introduced into the stream of bed medium very gently and as evenly as possible distributed over the whole width of the trough. The feeding in of the goods should also take place at some distance from the inlet end of the trough where the bed has been partly formed, for instance 0.3–1 meter from the point where the bed medium is supplied. In case the goods should be supplied from a great height together with the ore concentrate both the gangue pieces and the ore pieces will fall to the bottom of the trough, and if the feeding speed is high and/or the supply unevenly distributed over the width of the trough some particles of gangue may be jammed fast below the pieces of ore until a too thick bed will form above said pieces and prevent said pieces from floating upwards so that they will remain in the sink product. Naturally, this will occur most easily with small pieces of gangue. If, on the other hand, the goods is supplied slow and evenly distributed at some distance from the inlet end of the trough the pieces of gangue will sink only slowly or not at all in the thick suspension above the partly formed bed and will not penetrate into the bed, whereas the pieces of ore will sink rapidly in the suspension and then press themselves down to the bottom of the bed. The best way of effecting such a gentle and even supply is to cause the supplied goods to fall down onto a plane plate 18, as above described with reference to Fig. 2. The fore edge of the plate should lie as near the upper surface of the stream of bed medium as practically possible. The plate should also be disposed in a more inclined position than the trough in order that the particles should advance so quickly on the plate that the layer of goods on the plate is not essentially thicker than the layer wanted in the trough. A suitable inclination of the plate 18 is 1:10 to 1:5. The rear edge of the plate should be bent upwards so that the goods supplied is prevented from falling down at that end. When using a narrow trough the goods may be supplied from the side, as shown in Figs. 1 and 2, so as to form a longitudinal strand on the plate. The goods will then spread out rather evenly over the whole width of the plate by the action of the vibrations. When using a broader trough measures should be taken to obtain a fairly even distribution of the goods over the whole width of the plate already at the place where the goods is supplied.

The method above described has proved to be very suitable, partly for the reason that it is inexpensive in setting up, and partly because it is readily adaptable to local conditions. The difficulty inherent in this method is to provide for a uniform and controllable stream of sufficiently thickened bed medium from the funnel. To attain this, it is of considerable importance that means be provided for stirring and preferably also for thinning the medium at the bottom of the trough, such means having, for instance, the form of intakes for pressurized air and for water under pressure. It is important, furthermore, that the outlet valve from the funnel be formed in such manner as to offer the least possible resistance. Rubber sleeve valves have been found to be very suitable in this respect. They consist, as is well known, of a rubber sleeve of a circular cross section, on which a uniform contracting force about the same may be exerted with the aid of an external liquid pressure. In place of the funnel the use of any dewatering contrivance, for instance a mechanical classifier, a Dorr-thickener or a hydrocyclon, is conceivable.

What is claimed is:

1. An apparatus for the separation, according to the sink-and-float method, of raw crushed minerals or similar materials comprising a separating trough, means at one end of the trough for charging the trough with the goods to be separated, a shaking device for vibrating said trough to cause the goods to move along the trough, and means at the other end of the trough for dividing the stream of goods into superposed layers, the bottom of the trough consisting of at least two perforated plates arranged in parallel relationship at a relatively small distance above one another, the holes in two adjacent plates being displaced laterally so that the upper plate covers the holes in the lower plate.

2. An apparatus as claimed in claim 1, in which the upper plate has a close perforation of relatively large holes, whereas the lower plate has a scattered perforation of small holes arranged midway between the holes of the upper plate.

3. An apparatus as claimed in claim 1, in which the distance between the plates is less than the diameter of the holes in the adjacent lower plate.

4. A sink-and-float method for the separation of raw crushed minerals and the like consisting of pieces of different specific gravities wherein the raw material together with a bed medium of a mean specific gravity consisting of a mixture of granulated material and water are passed along a vibrated surface to cause pieces of different specific gravities to form superposed layers, the steps which comprise supplying the bed medium together with an excess amount of water to the upstream portion of said surface under conditions to cause the bed medium particles to settle while expelling excess water and to form a highly concentrated bed, supplying the raw material to be separated to the stream of bed medium at a point where the bed has been partly formed, supplying separate quantities of water from below to different longitudinally displaced divisions of the stream of materials, and controlling the distribution of said water to said different divisions to stabilize the flow of the bed along said surface, whereby excess water issuing out of said bed will form a stratum of water on the top of the bed and will flow to a downstream portion of said surface together with the bed.

References Cited in the file of this patent

UNITED STATES PATENTS

| | | |
|---|---|---|
| 2,303,367 | Kendall et al. | Dec. 1, 1942 |
| 2,368,416 | Holt | Jan. 30, 1945 |
| 2,426,337 | Bird | Aug. 26, 1947 |

FOREIGN PATENTS

| | | |
|---|---|---|
| 140,263 | Australia | Feb. 16, 1951 |
| 528,091 | France | Aug. 9, 1921 |